No. 620,234. Patented Feb. 28, 1899.
F. G. DU PONT.
APPARATUS FOR PURIFYING WATER.
(Application filed Mar. 21, 1898.)
(No Model.) 4 Sheets—Sheet 1.
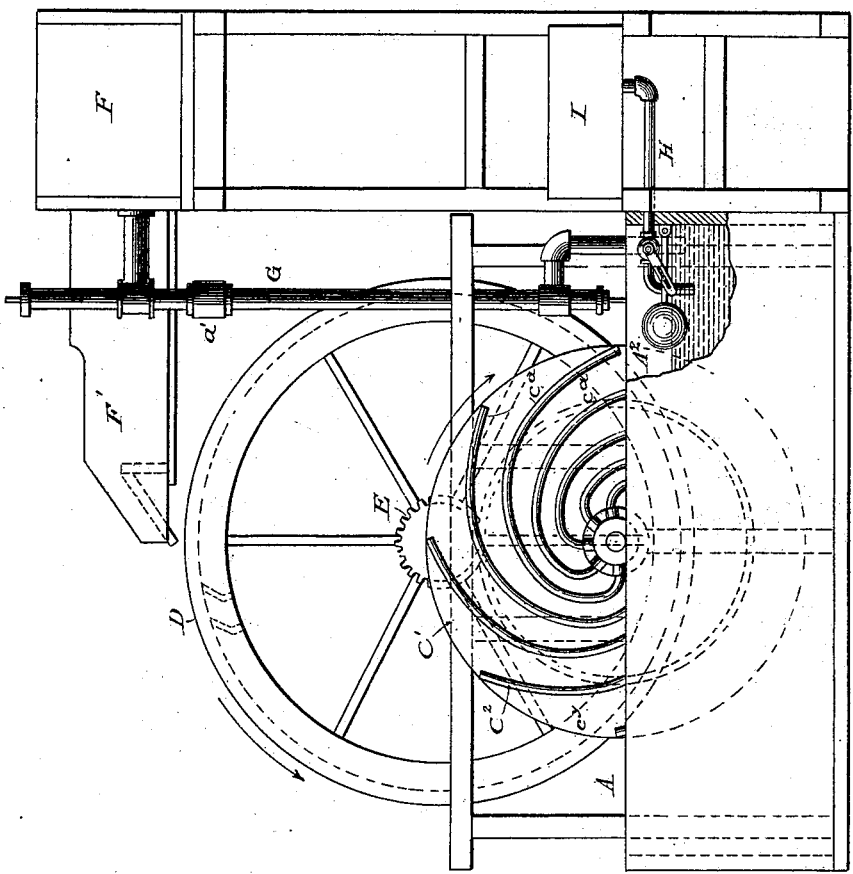
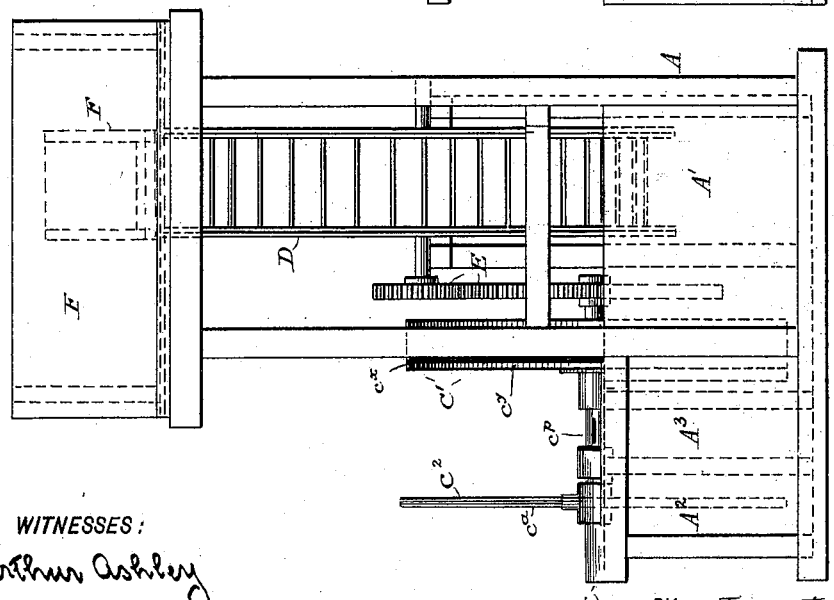

No. 620,234. Patented Feb. 28, 1899.
F. G. DU PONT.
APPARATUS FOR PURIFYING WATER.
(Application filed Mar. 21, 1898.)
(No Model.) 4 Sheets—Sheet 2.
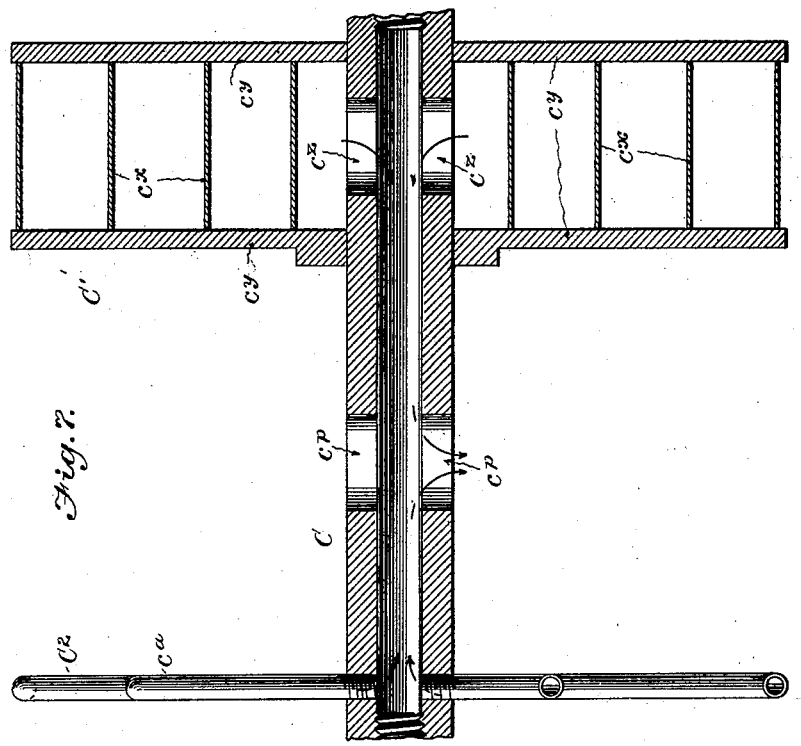
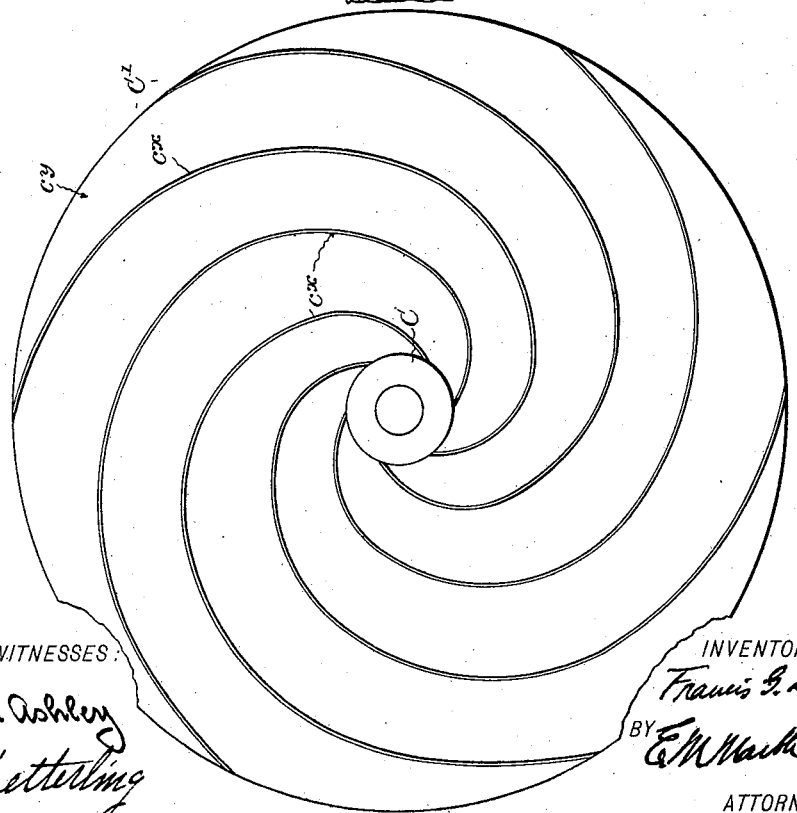
WITNESSES
Arthur Ashley
N. Wetterling
INVENTOR
Francis G. DuPont
BY
ATTORNEYS.

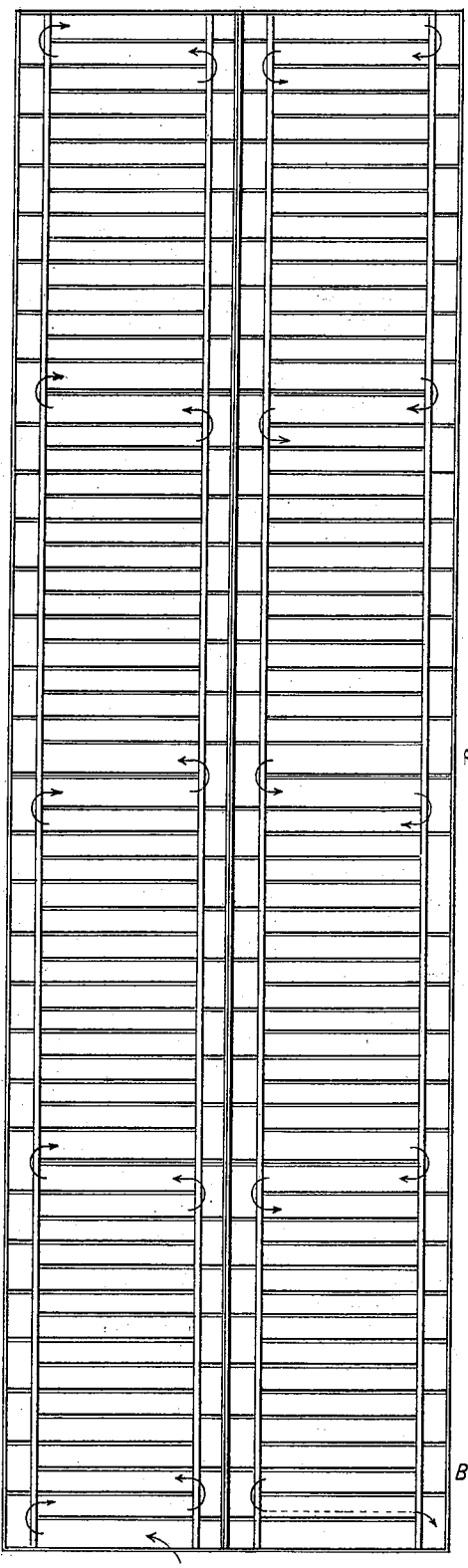

No. 620,234. Patented Feb. 28, 1899.
F. G. DU PONT.
APPARATUS FOR PURIFYING WATER.
(Application filed Mar. 21, 1898.)
(No Model.) 4 Sheets—Sheet 4.
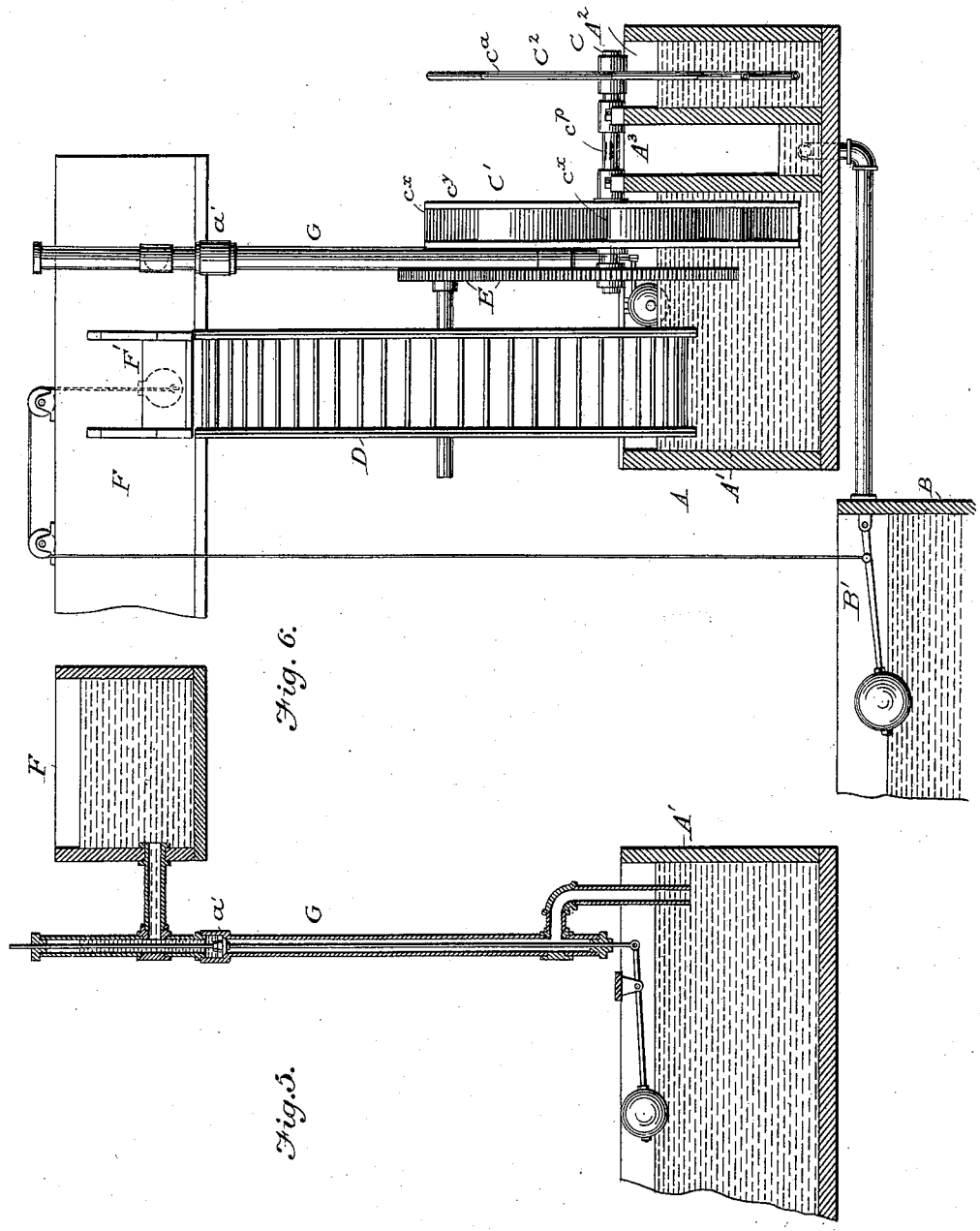
WITNESSES:
Arthur Ashley
N. Witterling
INVENTOR
Francis G. du Pont
BY E. M. Marble Son
ATTORNEYS

UNITED STATES PATENT OFFICE.

FRANCIS G. DU PONT, OF WILMINGTON, DELAWARE.

APPARATUS FOR PURIFYING WATER.

SPECIFICATION forming part of Letters Patent No. 620,234, dated February 28, 1899.

Application filed March 21, 1898. Serial No. 674,597. (No model.)

*To all whom it may concern:*

Be it known that I, FRANCIS G. DU PONT, a citizen of the United States, residing at Wilmington, in the county of New Castle and State of Delaware, have invented certain new and useful Improvements in Water-Purifying Apparatus; and I do hereby declare the following to be a full, clear, and exact description of the invention, such as will enable others skilled in the art to which it appertains to make and use the same.

The chief object of my invention is to devise an apparatus for removing from water the impurities which tend to incrust the inner surfaces of boilers.

A further object of my invention is to so construct a water-purifying apparatus that it will automatically regulate the amount of water purified to the amount of water needed for consumption and will also measure the amount of water used. Since under given conditions the amount of water used by a boiler bears a constant relation to the amount of coal required to consume the water, knowledge of the exact amount of water used enables me to ascertain with great accuracy the amount of coal used in any given time, so that my water-purifying apparatus becomes also a coal-measurer.

In seeking to accomplish the objects of my invention I have aimed to devise means for adding in exact proportion to each ounce of water used a predetermined amount of chemical solution for depositing the impurities contained in the water. I have so constructed this apparatus that the water being treated, as well as the chemical solution used, is accurately measured and is made equal in amount through automatic means to the volume of water drawn for use in boilers from the settling-tank, into which the water passes after being treated with the chemical solution.

My invention is fully illustrated in the drawings which accompany and form a part of this specification, in which the same reference-letters refer to the same or corresponding parts, and in which—

Figure 1 is an end view of my water-measuring apparatus, parts being broken away to show other parts in operative position. Fig. 2 is a side view of the apparatus shown in Fig. 1, in this figure also parts being removed to show the operation of the complete apparatus. Fig. 3 is a detail view showing the construction of the water-measuring wheel. Fig. 4 is a plan view of the settling-tank. Fig. 5 is a detail view illustrating a form of valve mechanism for controlling the height of the water in the water-reservoir $A'$. Fig. 6 is a detail view showing a form of valve mechanism for automatically controlling the position of the sluice-gate $F'$ by the level of the water in the settling-tank B. Fig. 7 is a detail sectional view of the shaft C and wheels mounted thereon.

Referring to the drawings, A represents a reservoir which is divided into three compartments. In the compartment $A'$ is the water which is to be purified, the amount of water in this division or compartment being maintained constant by means which will be hereinafter described. In the compartment $A^2$ is the chemical solution, which is to be added to the water in predetermined proportion. The level of the solution contained in this compartment is also maintained constant by means which will be presently described. The middle compartment $A^3$ receives the water after it has had added to it the chemical solution, and from this compartment leads an outlet-pipe to the settling-tank B.

It is self-evident that if the chemical solution in compartment $A^2$ is added to each ounce of water in compartment $A'$ in the proportion which experiments have shown is the proper proportion to effect the removal from the water of the impurities contained therein the impurities in the water will be entirely removed therefrom in the settling-tank B, into which the water passes. It is also evident that if the level of the settling-tank be maintained uniform water mixed with chemicals will have to be added thereto in exactly the proportion in which water is being supplied to the boiler. In other words, the amount of water consumed by the boilers within a given period of time can in this way be accurately determined if means are provided for recording continuously the amount of water treated with the chemical solution.

Transversely of the tank A is journaled the hollow shaft C. Upon this shaft is mounted the water-measuring wheel $C'$ and the chemical-measuring wheel $C^2$, the wheels entering, respectively, into the water-compartment A' and the chemical-compartment A² of the tank A. Each of said wheels is provided with a number of buckets, by which when the wheel revolves liquid is elevated from a corresponding compartment of the tank A and discharged into the hollow shaft C. The construction of the water-measuring wheel C' is shown in detail in Fig. 3. As there shown, it consists of a series of cycloidal-shaped blades $c^x$, held in position by the side disks $c^y$. Blades and disks may be made of wood or metal; but I prefer to make the blades of metal and the disks of wood. The chemical-measuring wheel C² embodies the same principle in its construction; but the buckets are formed by cycloidal pipes $c^a$. Both wheels from their manner of operation may be termed "dip-wheels." In both instances the water or solution raised by the rotation of the wheels is delivered into the hollow shaft C through openings $c^z$, formed therein, and escapes from the hollow shaft into the compartment A³ of the tank A through similar openings $c^p$. The cycloidal curve of the buckets insures uniform and steady flow of the liquid into the shaft C so long as the shaft revolves. The water from the tank A', passing through the hollow shaft C in small quantities, is thoroughly mixed with the chemical solution, so that complete precipitation of the impurities contained in the water is rendered possible.

The rotation of the hollow shaft C, and therefore of the water and chemical measuring wheels mounted thereon, while it may be effected in any desired manner, is preferably effected by the action of the overshot water-wheel D. This wheel is connected with shaft C by suitable gearing E and is rotated by water delivered through the sluice-gate F' of the tank F. The water used in effecting the rotation of the water-wheel falls into the water-compartment A' of the tank A and is thence carried by the water-measuring wheel into the hollow shaft C and thence through the middle division of the tank A into the settling-tank B.

The settling-tank B consists of a tank having series of partitions, so that water introduced at one end thereof has to flow slowly and in a sinuous course through a long passage before it can escape at the outlet end.

With the apparatus thus described in order to accurately measure the amount of water consumed it is only necessary to make the amount of water introduced into the settling-tank equal to that withdrawn therefrom, to provide means for maintaining constant the level of the contents of the tanks in which the water and chemical measuring wheels C' and C² rotate, and to automatically govern the speed of rotation of the water-wheel D with relation to the amount of water drawn off from the settling-tank.

The level of the water in compartment A' of the tank A is maintained constant through an automatic valve $a'$, leading from the water-supply pipe G. It is true that the water used to effect the rotation of the water-wheel D escapes into the water-compartment A'; but the amount of water thus introduced into the compartment is not sufficient to maintain the level of the water therein, and additional water introduced through the supply-pipe G is necessary.

The level of the chemical solution in the chemical-compartment A² is maintained constant by an automatic valve in the supply-pipe H, which leads to the supply-tank I.

The automatic regulation of the speed of rotation of the water-wheel D in accordance with the amount of water drawn off from the settling-tank is effected by the connection of the sluice-gate F' with the float B' of the settling-tank, the connection being such that when the float B' falls the sluice-gate F' opens and by discharging an increased volume of water causes the water-wheel to rotate more rapidly, and vice versa. This connection is only indicated in the drawings and is not shown in detail; but any form of automatic governing device known in the art can be used.

In the operation of the apparatus thus described the water delivered from the supply-tank F discharges upon the water-wheel D and rotates the same, and thereby the shaft C, upon which the water and chemical measuring wheels C' and C² are mounted. The water thus discharged escapes into the compartment A' of the tank A. The automatic valve $a'$ regulates the flow of water through the pipe G, so as to maintain a constant level of fluid in the compartment A'. The revolution of the water-measuring wheel and the chemical-measuring wheel taking place as it does in tanks, the level of the contents of which is maintained constant, results in the discharge into the hollow shaft C of water and chemical solution in predetermined proportion, and this proportion is constant, whatever be the rate of operation of the apparatus. This proportion should be fixed by previous experiment, and when once determined should not be varied except within narrow limits. The water and chemical solution mingling in the hollow shaft C escape through openings $c^p$ into the compartment A³, from which they flow into the settling-tank B. As the water is drawn off from the settling-tank B the float B' falls, and through the connecting mechanism the sluice-gate F' opens. As the amount of water drawn off from the settling-tank increases the sluice-gate F' opens wider, and consequently the water-wheel D is caused to revolve more rapidly and the level of the water in the settling-tank maintained.

So sensitive is the connection between the amount of steam consumed by the boiler and the amount of coal required to produce the steam that by obtaining a coefficient which will represent the ratio between the amount of steam consumed and the amount of coal required to produce it the amount of coal consumed in any given time can be determined by simply noting the number of revolutions of the water-measuring wheel during that time and multiplying this number by the coefficient. In this way a very close watch can be kept over the coal used and a record obtained which is perfectly trustworthy.

The chemicals used in boilers to effect the purification thereof differ with different waters. For most waters I prefer to use for the purification thereof caustic soda on account of its cheapness and effectiveness; but for some waters which are turbid from suspended earthy matters or which are rich in lime salts I find that to produce a precipitate which will settle well it is desirable to use a salt of iron, and I consider the ferrous sulfate commonly called "copperas" to be the best. When this is used, I add another chemical-measuring wheel to the shaft and add the iron salt to the water just before the soda is put in. The addition of the caustic soda to the water after the ferrous sulfate has been thoroughly mixed with the same causes a precipitate to form, which carries down all matter suspended in the water.

Having thus fully described my invention, what I claim as new, and desire to secure by Letters Patent, is—

1. In a water-purifying apparatus, the combination, with separate reservoirs for the water to be treated and for the chemical or chemicals to be used, of a fluid-measuring device for each of said reservoirs having movable receptacles adapted to remove fluid from the reservoir, when the device is operated, a channel common to said fluid-measuring devices for receiving the fluid discharged therefrom, and means for operating said measuring devices, substantially as described.

2. In a water-purifying apparatus, the combination, with separate reservoirs for the water to be treated and for the chemical or chemicals to be used, of a dip-wheel for each of said reservoirs, a hollow shaft upon which said dip-wheels are mounted and into which said wheels are adapted to discharge, said shaft having a common outlet for the fluids from the dip-wheels, and means for rotating said shaft, substantially as described.

3. In a water-purifying apparatus, the combination, with separate reservoirs for the water to be treated and for the chemical or chemicals to be used, of a fluid-measuring device for each of said reservoirs having movable receptacles adapted to remove fluid from the reservoir, when the device is operated, means for operating said measuring devices, and means for maintaining constant the level of the fluid in said reservoirs, automatically, substantially as described.

4. In a water-purifying apparatus, the combination, with separate reservoirs for the water to be treated and for the chemical or chemicals to be used, of a fluid-measuring device for each of said reservoirs having movable receptacles adapted to remove fluid from the reservoir, when the device is operated, means for operating said measuring devices, a tank into which the fluids from said measuring devices pass, and means operated by variation in the level of the fluid in such tank, for regulating the rate of operation of said measuring devices, substantially as described.

5. In water-purifying apparatus, the combination with separate reservoirs for the water to be treated and the cheminal or chemicals to be used, of a hollow shaft, wheels mounted on said shaft entering said reservoirs and adapted to raise and discharge the contents thereof into said shaft, said shaft having a common discharge-opening for the fluids from said wheels, means for rotating said shaft, and means, automatically operated by the rise and fall of the level of the fluid in the settling-tank, for regulating the speed of rotation of said shaft, substantially as described.

6. In water-purifying apparatus, the combination with separate reservoirs for the water to be treated and the chemical or chemicals to be used, of revolubly-mounted wheels entering said reservoirs and adapted to raise and discharge the contents thereof into a suitable receptacle, a water-wheel arranged to drive said fluid-elevating wheels, a tank into which the fluid from said wheels flows, and means automatically controlled by the rise and fall of the level of the fluid in said tank for controlling the speed of rotation of said water-wheel, substantially as described.

7. In a water-purifying apparatus, the combination with separate reservoirs for the water to be treated and the chemical or chemicals to be used, of a shaft, wheels mounted on said shaft entering said reservoirs and provided with means for raising the contents of said reservoirs and discharging the same into a suitable receptacle, a tank into which the fluid from said wheels flows, a water-wheel arranged to drive said shaft, a valve controlling the flow of water to said water-wheel, and a float in said tank controlling the said valve, and operated by the rise and fall of the fluid within said tank, substantially as described.

8. In a water-purifying apparatus, the combination, with separate reservoirs for the water to be treated and the chemical or chemicals to be used, of a shaft, a water-wheel arranged to drive said shaft and so located that the water flowing from it passes into the reservoir for the water to be treated, wheels mounted on said shaft entering said reservoirs and adapted to raise and discharge the contents thereof into a suitable receptacle, a tank into which the fluid from said wheels passes, a valve controlling the flow of water to the water-wheel, a float in said tank controlling said valve, and operated by the rise and fall of the fluid in said tank, and another valve, controlling the flow of water from an auxiliary source into the reservoir for the water to be treated, and operated by the rise and fall of the water within said reservoir, substantially as described.

9. In a water-purifying apparatus, the combination, with separate reservoirs for the water to be treated and for the chemical or chemicals to be used, of a dip-wheel for each of said reservoirs, having cycloidal buckets, a hollow shaft upon which said dip-wheels are mounted and into which said wheels are adapted to discharge, said shaft having a common outlet for the fluids from the dip-wheels, and means for rotating said shaft, substantially as described.

In testimony whereof I affix my signature in presence of two witnesses.

FRANCIS G. DU PONT.

Witnesses:
W. S. MATCHETT,
JOHN W. MACKLEM.